UNITED STATES PATENT OFFICE.

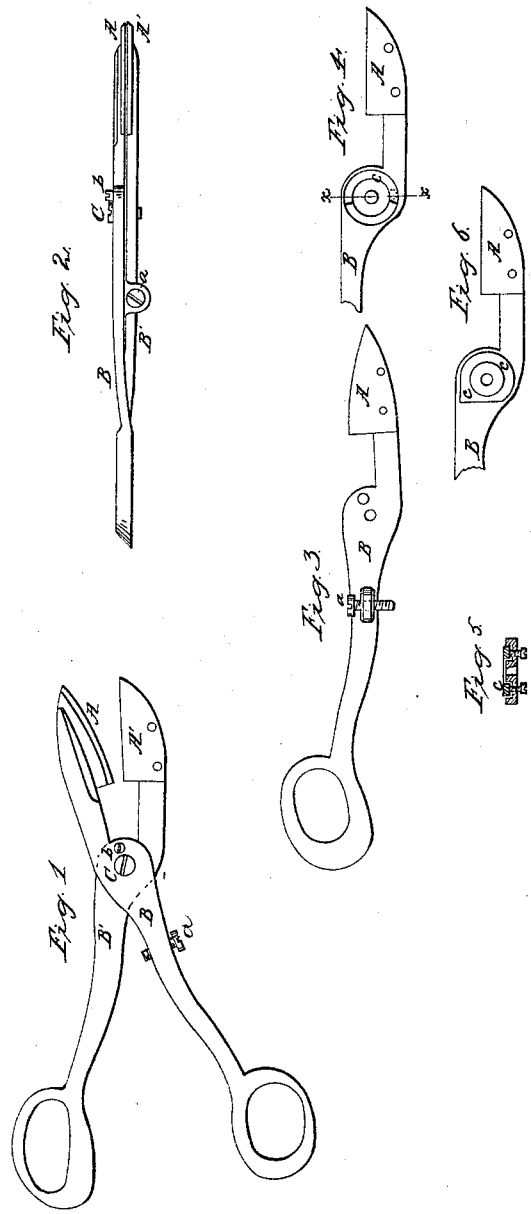

G. H. SEYMOUR AND W. B. BARNARD, OF WATERBURY, CONNECTICUT.

IMPROVED BUTTON-HOLE CUTTER.

Specification forming part of Letters Patent No. 57,584, dated August 28, 1866.

*To all whom it may concern:*

Be it known that we, GEORGE H. SEYMOUR and WILLIAM B. BARNARD, both of Waterbury, in the county of New Haven and State of Connecticut, have invented a new and useful Improvement in Shears and Button-Hole Cutters; and we hereby declare the following to be a full, clear, and exact description thereof, reference being had to the accompanying drawings, forming a part of this specification, in which—

Figure 1 is a plan view of our improved button-hole cutter; Fig. 2, an edge view thereof; Fig. 3, a view of one of the divisions thereof detached, illustrating the position and arrangement of the gage-screw; Fig. 4, a detached view of the pivot-piece and blade of a cutter, illustrating the combination of an adjustable washer with the pivot-piece; Fig. 5, a transverse section in the line x x of Fig. 4, showing the arrangement and combination of set-screws with an adjustable washer; and Fig. 6, another detached view of the pivot-piece and blade of a cutter, illustrating a second form of adjustable washer in combination therewith.

Similar letters indicate like parts in all of the figures.

The nature of our invention consists in the combination of one or more set-screws with the opposite bearing-surfaces of the two divisions of a pair of shears or button-hole cutters, so as to adjust thereby the proximity of the cutting-edges thereof, and also in the interposition of a washer between the two divisions or halves of shears or button-hole cutters, by preference encircling the pivot thereof, said washer being let into a groove or recess in one of the divisions and adjusted therein by means of one or more set-screws.

My improved button-hole shears are constructed of steel cutting-blades A A', riveted to suitable handles, B B', of brass, malleable iron, or other metal, and pivoted together by an ordinary pivot-pin or screw, C, in the usual manner. A set-screw, $a$, is placed upon one handle to bear against the other, and thus control the length of cut produced by the blades. A set-screw, $b$, is made to screw through one division of the shears, near the pivot-pin, and bear against the other division, as seen in Fig. 2 of the accompanying drawings.

In order to obtain a more perfect and finished adjustable bearing between the two divisions of the shears than the simple set-screw will allow, I prefer to insert a metallic strip or washer, $c$, into a groove or recess cut in the face of one division of the shears, near or around the pivot-aperture therein, and cause the set screw or screws to bear against said washer, as illustrated by Fig. 5 of the drawings. This adjusting-strip or washer may be of any desired shape or form; but the circular or semicircular forms illustrated in Figs. 4 and 5 are doubtless the best. Its use protects the set-screw and its bearings from all friction and consequent wear, and permits a more perfect and effective adjustment of the edges of the cutting-blades in respect to each other, as well as in reference to the texture and thickness of the cloth to be cut.

Having thus fully described our improvements in shears and button-hole cutters, we claim as our invention and desire to secure by Letters Patent—

1. One or more set-screws so combined with one half or division of a pair of shears as to work through said division against the bearing-surface of the other division, to determine the lateral adjustment of the two, and of the cutting-blades thereof with reference to each other, substantially in the manner as herein set forth.

2. An adjustable bearing-strip or washer upon one division of a pair of shears, combined with two set-screws in said division bearing against said strip or washer, substantially in the manner and for the purpose herein described.

The foregoing specification of our improvements in button-hole scissors signed this 15th day of March, A. D. 1866.

GEORGE H. SEYMOUR.
  WM. B. BARNARD.

In presence of—
 C. D. BAILEY,
 JOHN W. PAUL.